(12) United States Patent
Bolger et al.

(10) Patent No.: US 12,654,705 B2
(45) Date of Patent: Jun. 16, 2026

(54) UPHILL VEHICLE LAUNCH IN ONE-PEDAL DRIVING MODE

(71) Applicant: FORD GLOBAL TECHNOLOGIES, LLC, Dearborn, MI (US)

(72) Inventors: Bryan Michael Bolger, Canton, MI (US); Sergey Gennadievich Semenov, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1139 days.

(21) Appl. No.: 17/018,619

(22) Filed: Sep. 11, 2020

(65) Prior Publication Data

US 2022/0080971 A1 Mar. 17, 2022

(51) Int. Cl.
| | |
|---|---|
| *B60W 30/18* | (2012.01) |
| *B60W 10/08* | (2006.01) |
| *B60W 10/184* | (2012.01) |
| *B60W 30/182* | (2020.01) |
| *B60W 40/06* | (2012.01) |

(52) U.S. Cl.
CPC ...... *B60W 30/18118* (2013.01); *B60W 10/08* (2013.01); *B60W 10/184* (2013.01); *B60W 30/18027* (2013.01); *B60W 30/18127* (2013.01); *B60W 30/182* (2013.01); *B60W 40/06* (2013.01); *B60W 2540/10* (2013.01); *B60W 2540/12* (2013.01); *B60W 2552/15* (2020.02)

(58) Field of Classification Search
CPC .......... B60W 30/18118; B60W 10/08; B60W 10/184; B60W 10/188; B60W 10/192; B60W 30/18027; B60L 7/26; B60L 7/24; B60L 15/2072; B60L 15/2081; B60T 2201/06
USPC .......................................................... 701/22
See application file for complete search history.

(56) References Cited

U.S. PATENT DOCUMENTS

| | | | |
|---|---|---|---|
| 9,682,705 B2 | 6/2017 | Khafagy et al. | |
| 10,351,111 B2 | 7/2019 | Hernandez | |
| 2007/0191181 A1* | 8/2007 | Burns | B60W 30/18118 |
| | | | 477/40 |
| 2018/0065629 A1* | 3/2018 | Wolff | B60W 30/18009 |
| 2018/0290655 A1* | 10/2018 | Sato | B60L 15/2018 |
| 2019/0210603 A1* | 7/2019 | Xu | B60W 10/184 |
| 2019/0381895 A1* | 12/2019 | Shindo | B60L 15/2081 |
| 2020/0164885 A1* | 5/2020 | Kujubu | B60W 30/18127 |
| 2020/0282994 A1* | 9/2020 | Beyer | B60W 10/103 |

FOREIGN PATENT DOCUMENTS

| | | | | |
|---|---|---|---|---|
| KR | 101618453 B1 | 5/2016 | | |
| WO | WO-2019003211 A1 * | 1/2019 | ...... | B60W 30/18118 |

* cited by examiner

*Primary Examiner* — Angela Y Ortiz
*Assistant Examiner* — Aaron K McCullers
(74) *Attorney, Agent, or Firm* — David B. Kelley; Brooks Kushman P.C.

(57) ABSTRACT

A vehicle includes a powertrain having an electric machine configured to power driven wheels and friction brakes. A vehicle controller is programmed to, with the vehicle being in a one-pedal driving mode and the friction brakes automatically engaged to hold the vehicle stationary, release the friction brakes absent input from a brake pedal in response to an estimated torque of the driven wheels exceeding a grade-compensation torque threshold that is based on road grade to launch the vehicle without rollback.

20 Claims, 3 Drawing Sheets

UPHILL VEHICLE LAUNCH IN ONE-PEDAL DRIVING MODE

TECHNICAL FIELD

This disclosure relates to electric vehicles having a one-pedal driving mode and more specifically to launching the vehicle when in the one-pedal mode.

BACKGROUND

Electrified vehicles, such as fully electric and hybrid electric vehicles, include at least one electric machine for propelling the vehicle. The electric machine is powered by a traction battery that supplies energy to the electric machine, which reduces a state of charge (SOC) of the battery. Many electrified vehicles are capable of regenerative braking to recharge the battery by converting mechanical power into electrical power.

SUMMARY

According to an embodiment, a vehicle includes a powertrain having an electric machine configured to power driven wheels and friction brakes. A vehicle controller is programmed to, with the vehicle being in a one-pedal driving mode and the friction brakes automatically engaged to hold the vehicle stationary, release the friction brakes absent input from a brake pedal in response to an estimated torque of the driven wheels exceeding a grade-compensation torque threshold that is based on road grade to launch the vehicle without rollback.

According to another embodiment, a vehicle includes an accelerator pedal, a brake pedal, a powertrain having an electric machine configured to power driven wheels, and friction brakes. A controller is programmed to, during a one-pedal driving mode: command the electric machine to propel and regeneratively brake the vehicle based on a position of the accelerator pedal only; in response to the vehicle becoming stationary, command engagement of the friction brakes and end regenerative braking; and, in response to the position of the accelerator pedal exceeding a predefined threshold position and an estimated torque of the driven wheels exceeding a grade-compensation torque threshold that is based on road grade, release the friction brakes, absent input from the brake pedal, to launch the vehicle without rollback.

According to yet another embodiment, a method of launching a vehicle when in a one-pedal driving mode includes: commanding an electric powertrain to propel and regeneratively brake the vehicle based on a position of an accelerator pedal only; in response to the vehicle becoming stationary, commanding engagement of friction brakes; and releasing the friction brakes in response to an estimated wheel torque exceeding a grade-compensation torque threshold that is based on road grade to launch the vehicle without rollback.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
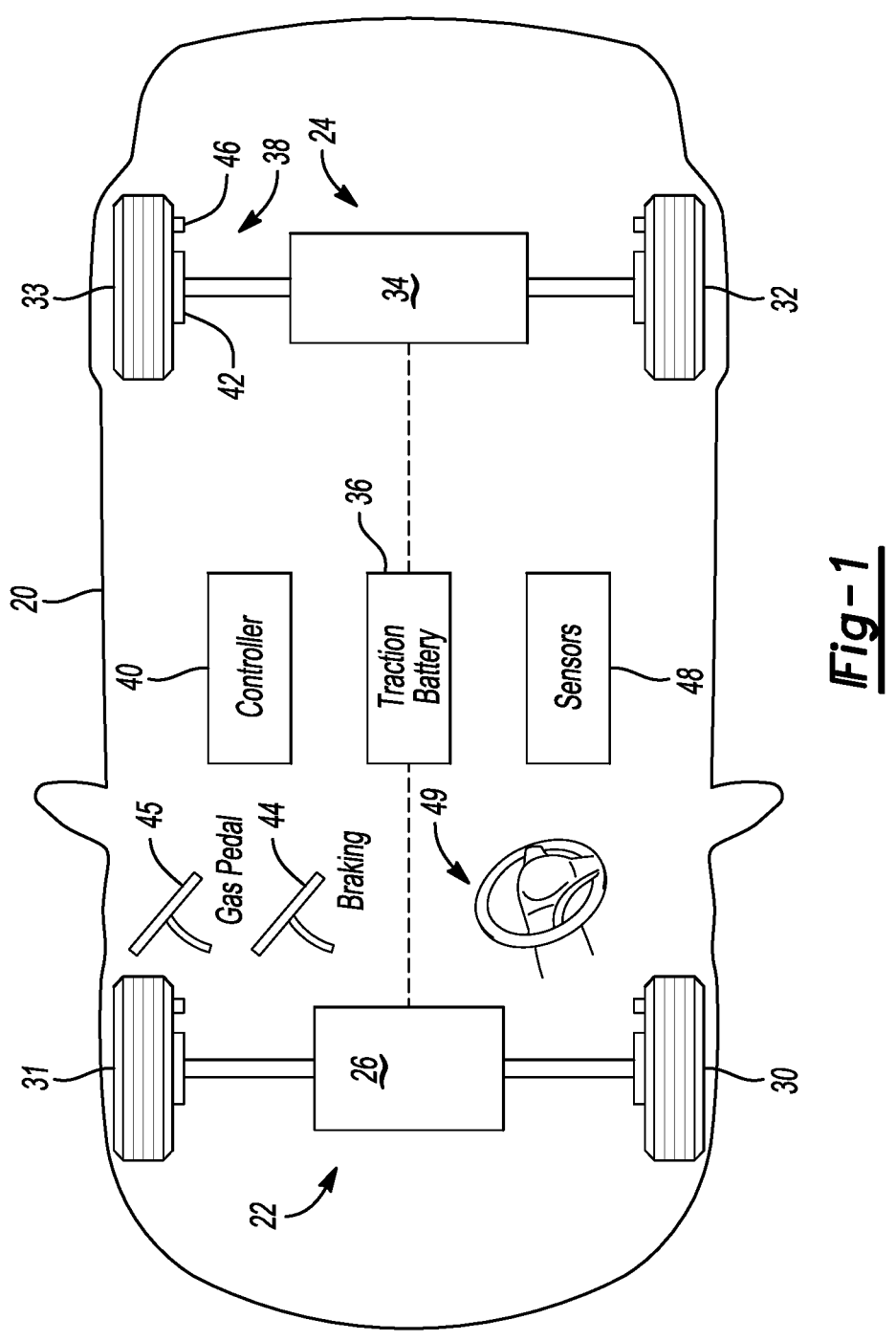
FIG. 1 is a schematic diagram of an electric vehicle.

Referring to FIG. 1, an electrified vehicle 20 is illustrated as a fully electric vehicle but, in other embodiments, the electrified vehicle 20 may be a hybrid-electric vehicle that includes an internal-combustion engine. The vehicle 20 is shown as being an electric all-wheel drive (AWD) vehicle, but may be two-wheel drive, such as front-wheel drive or rear-wheel drive, in other embodiments. The vehicle 20 may include a primary drive axle 24 and a secondary drive axle 22. In the illustrated embodiment, the primary drive axle 24 is the rear axle and the secondary drive axle 22 is the front axle. In other embodiments, the front axle may be the primary drive and the rear axle may be the secondary drive. The primary and secondary axles may include their own powerplant, e.g., an electric machine, and are capable of operating independently of each other or in tandem to accelerate (propel) or brake the vehicle 20. In the illustrated embodiment, both powerplants are electric machines.

The secondary drive axle 22 may include at least one powerplant, e.g., electric machine 28, operable to power the secondary wheels 30 and 31. A gearbox (not shown) may be included to change a speed ratio between the wheels 30, 31 and the powerplant(s). The primary drive axle 24 may include at least one powerplant, e.g., electric machine 34, that is operably coupled to the primary wheels 32 and 33. A gearbox (not shown) may be included to change a speed ratio between the powerplant(s) 34 and the wheels 32, 33.

The electric machines 28, 34 are capable of acting as motors to propel the vehicle 20 and are capable of acting as generators to brake the vehicle via regenerative braking. The electric machines 28, 34 may be permanent magnet synchronous alternating current (AC) electric motors or other suitable type.

The electric machines 28, 34 are powered by one or more traction batteries, such as traction battery 36. The traction battery 36 stores energy that can be used by the electric machines 28, 34. The traction battery 36 typically provides a high-voltage direct current (DC) output from one or more battery cell arrays, sometimes referred to as battery cell stacks, within the traction battery 36. The battery cell arrays include one or more battery cells. The battery cells, such as a prismatic, pouch, cylindrical, or any other type of cell, convert stored chemical energy to electrical energy. The cells may include a housing, a positive electrode (cathode), and a negative electrode (anode). An electrolyte allows ions to move between the anode and cathode during discharge, and then return during recharge. Terminals may allow current to flow out of the cell for use by the vehicle 20. Different battery pack configurations may be available to address individual vehicle variables including packaging constraints and power requirements. The battery cells may be thermally regulated with a thermal management system.

The traction battery 36 may be electrically connected to one or more power-electronics modules through one or more contactors. The module may be electrically connected to the electric machines 28, 34 and may provide the ability to bi-directionally transfer electrical energy between the traction battery 36 and the electric machines 28, 34. For example, a typical traction battery 36 may provide a DC voltage while the electric machines 28, 34 may require a three-phase AC. The power-electronics module may convert the DC voltage to a three-phase AC voltage as required by the electric machines. In a regenerative mode, the power-electronics module may convert the three-phase AC voltage from the electric machines 28, 34 acting as generators to the DC voltage required by the traction battery 36.

The vehicle 20 includes a controller 40 in electric communication with a plurality of vehicle systems and is configured to coordinate functionality of the vehicle. The controller 40 may be a vehicle-based computing system that includes one or more controllers that communicate via a serial bus (e.g., controller area network (CAN)) or via dedicated electrical conduits. The controller 40 generally includes any number of microprocessors, ASICs, ICs, memory (e.g., FLASH, ROM, RAM, EPROM and/or EEPROM) and software code to co-act with one another to perform a series of operations. The controller 40 also includes predetermined data, or "lookup tables" that are based on calculations and test data, and are stored within the memory. The controller 40 may communicate with other vehicle systems and controllers over one or more wired or wireless vehicle connections using common bus protocols (e.g., CAN and LIN). Used herein, any reference to "a controller" refers to one or more controllers. The controller 40 may include battery energy control module (BECM) that operates at least the traction battery, a powertrain control module (PCM) that operates at least the electric machines, and an ABS control module that controls the anti-lock braking system (ABS) 38.

The controllers communicate with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by a controller within each of the subsystems identified above.

The ABS 38 may be a hydraulic system, an electric system, or a combination of electric and a hydraulic. The ABS 38 may include a brake module and a plurality of friction brakes 42 located at each of the wheels. Modern vehicles typically have disc brakes; however, other types of friction brakes are available, such as drum brakes. Each of the brakes 42 are in fluid communication with the brake module via a brake line configured to deliver fluid pressure from the module to a caliper of the brakes 42. The module may include a plurality of valves configured to provide independent fluid pressure to each of the brakes 42. The brake module may be controlled by operation of a brake pedal 44 and/or by the vehicle controller 40 without input from the driver. The ABS system 38 also includes associated wheel-speed sensors 46 each located at one of the wheels. Each sensor 46 is configured to output a wheel-speed signal to the controller 40 indicative of a measured wheel speed.

The vehicle 20 is configured to slow down using regenerative braking, friction braking, or a combination thereof. The controller 40 includes programming for aggregating a demanded braking torque between regenerative braking, i.e., the electric machines, and the friction brakes 42. ("Torque" may be abbreviated by the symbol $\tau$ in the specification and drawings.) The demanded braking torque may be based on driver input, e.g., a position of the brake pedal 44, or by the controller 40. The aggregator of the controller 40 may be programmed to slow the vehicle using regenerative braking whenever possible and apply the friction brakes 42 when necessary.

The vehicle 20 includes an accelerator pedal 45. The accelerator pedal 45 includes a range of travel from a released position to a fully depressed position and indeterminate positions therebetween. The accelerator pedal 45 includes an associated sensor (not shown) that senses the position of the pedal 45. The sensor is configured to output a pedal-position signal to the controller 40 that is indicative of a sensed position of the pedal 45. The accelerator pedal 45 is used by the driver to command a desired speed and torque of the vehicle. Under normal conditions, the accelerator pedal 45 is used by the driver to set a driver-demanded torque. The controller 40 may be programmed to receive the pedal-position signal and determine the driver-demanded torque based on pedal position and other factors such as vehicle speed. During a one-pedal driving mode, the accelerator pedal is used to set a target vehicle propulsion torque was well as a target braking torque as will be described in detail below.

The vehicle 20 may include one or more sensors 48 configured to determine accelerations of the vehicle. For example, the sensors 48 may include a yaw-rate sensor, a lateral-acceleration sensor, a longitudinal-acceleration sensor, a pitch sensor, and a roll sensor. The yaw-rate sensor generates a yaw-rate signal corresponding to the yaw rate of the vehicle. Using the yaw rate sensor, the yaw acceleration may also be determined. The lateral-acceleration sensor outputs a lateral-acceleration signal corresponding to the lateral acceleration of the vehicle. The longitudinal-acceleration sensor generates a longitudinal-acceleration signal corresponding to the longitudinal acceleration of the vehicle. The pitch sensor generates a signal corresponding to the pitch of the vehicle, and the roll sensor generates a signal corresponding to the roll of the vehicle. The various sensors are in communication with the controller 40. In some embodiments, the yaw rate, lateral acceleration, longitudinal acceleration, the pitch, the roller and other measurements may be measured by a single sensor.

The one or more sensors 48 may be used by the controller 40 to determine a grade of the road, e.g., flat, uphill, or downhill. Road grade is determined by comparing accelerometer-based longitudinal acceleration (which includes the effects of gravity) to acceleration derived from motor speed (which does not include the effects of gravity). The difference between those two accelerations yields the acceleration component due to gravity which can be converted to an equivalent wheel torque by multiplying by vehicle mass and tire radius.

The vehicle 20 may also include a steering system 49 that turns the front wheels 30, 31. The steering system 49 may include a steering wheel connected to a steering shaft that actuates a steering box, such as a rack-and-pinion assembly. The steering box is operably coupled to the front wheels 30, 32 and turns the wheels according to inputs from the steering wheel. The steering system 49 may include one or more sensors configured to output a signal indicative of steering angle to the controller 40. The steering sensor may measure rotation of the steering shaft.

Traditionally, drivers using conventional vehicles control the vehicle speed by modulating the accelerator and brake pedals. The driver depresses the accelerator pedal to go faster and applies the brake pedal to slow down. Electric vehicles present an opportunity for an alternative control called one-pedal driving in which the vehicle can be controlled using only the accelerator pedal. The vehicle may offer a one-pedal mode that is selectable by the driver through a human-machine interface (HMI) of the vehicle. The HMI may be a touchscreen, buttons, or the like. The HMI may include one or more menu pages for the one-pedal driving mode. The menu pages have selectable fields including enable/disable one-pedal driving mode and others. The one-pedal mode may offer adjustable regenerative braking torque that allows the drive to select the braking torque applied when the accelerator pedal 45 is lifted. Alternatively, this may be set by the manufacturer. When in the one-pedal mode, depressing the accelerator pedal operates as normal and causes an increase in the driver-demanded torque to accelerate the vehicle. Releasing the accelerator pedal, however, initiates regenerative braking to decelerate the vehicle without requiring application of the brake pedal. The brake pedal may still be actuated during the one-pedal mode to increase the amount of braking as needed.

In one pedal mode, the vehicle may be brought to a complete stop without requiring actuation of the brake pedal in some embodiments. In other embodiments, releasing the accelerator pedal may only slow the vehicle to a crawl speed and require driver application of the brake pedal to bring the vehicle to a complete stop. Once the vehicle comes to a complete stop, the friction brakes may be automatically applied by the controller 40 to hold the vehicle stationary without requiring support from the electric machines 26 or 34.

When the vehicle 20 is brought to a complete stop in one-pedal mode, the vehicle may be launched, i.e., accelerated from standstill, by depressing the accelerator pedal 45. The controller 40 is configured to release the friction brakes in concert with increasing powertrain torque to launch the vehicle smoothly. Generally, the friction brakes are released once the powertrain torque is sufficient to propel the vehicle forward. The precise timing of friction brake release is based on a grade of the road. For example, when the vehicle is on flat ground, the friction brakes may be immediately released upon application of the accelerator pedal. In another example, such as when the vehicle is stopped uphill, the release of the friction brakes may be delayed until the powertrain torque is sufficient to prevent vehicle rollback. Vehicle rollback is when the vehicle unintentionally moves in the reverse direction due to gravity. Rollback commonly occurs when the vehicle is on an uphill grade.

Figure 2:
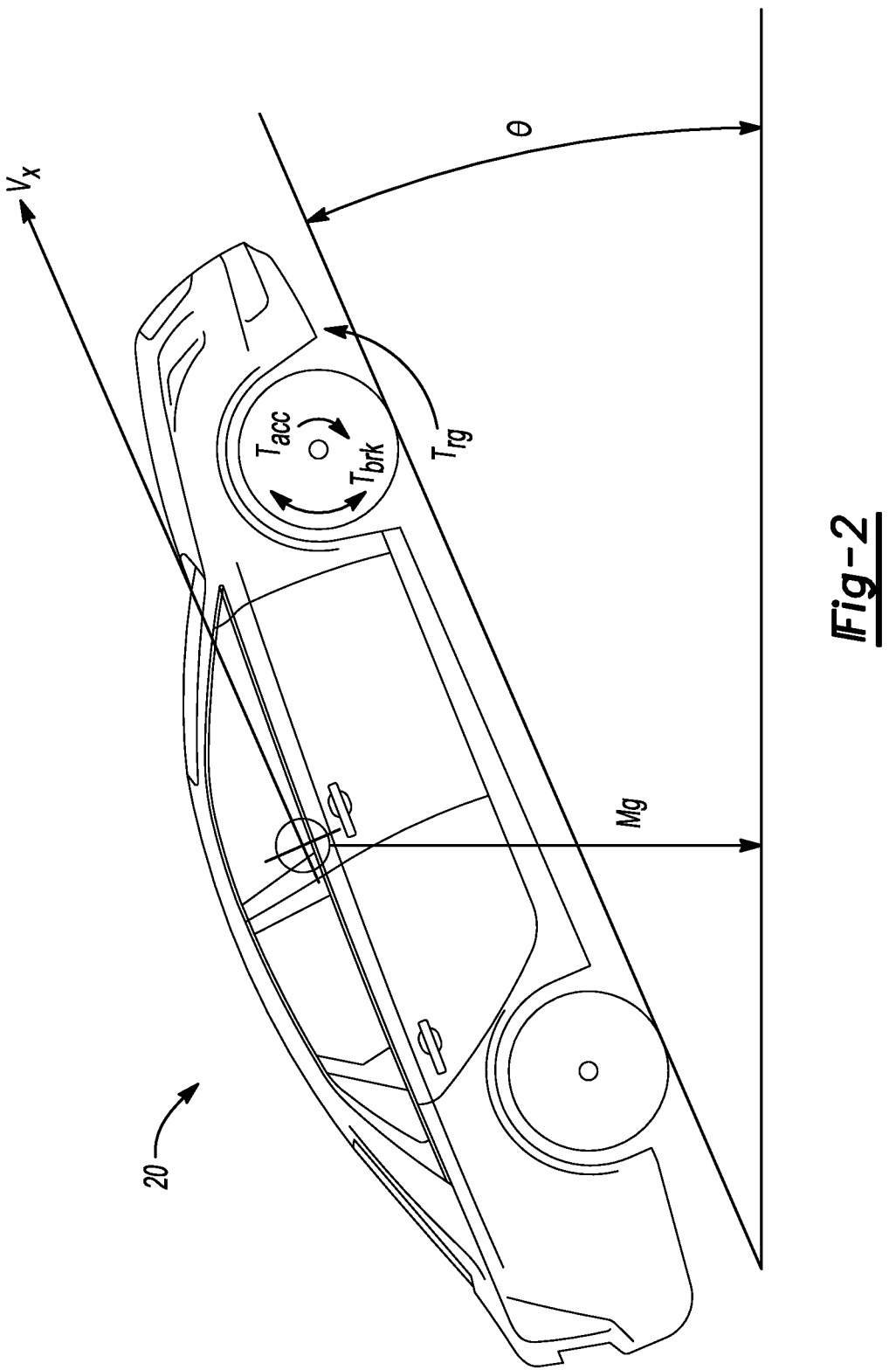
FIG. 2 is a schematic diagram showing forces and torques associated with a vehicle stopped on an uphill grade.

Referring to FIG. 2, the vehicle 20 is shown stopped on an inclined surface and illustrated with a number of forces and moments acting thereon. The surface has a gradient θ, which may also be referred to as a road grade. Here, the road grade is uphill, which refers to increasing elevation in a forward direction of travel. A downhill road grade refers to decreasing elevation in the forward direction. The resultant torque at the wheels of the vehicle, $T_{veh}$, may be calculated using equation 1 as shown below:

$$T_{veh}=T_{acc}+T_{brk}-T_{rg}=0 \tag{1}$$

Where $T_{acc}$ represents the propulsion torque provided by the powertrain, $T_{brk}$ is the brake torque provided by the vehicle brake system(s), and $T_{rg}$ is the torque acting on the vehicle due to road grade or external forces. $T_{rg}$ may be referred to as road-grade torque. In the uphill example, $T_{acc}$ is depicted as a positive or clockwise moment, and $T_{rg}$ is depicted as negative or counter-clockwise moments. $T_{brk}$ acts against the rotation of the wheels and would therefore act as a clockwise moment about the wheels when the vehicle is urged in a rearward direction by $T_{rg}$, and $T_{brk}$ would act as a counter-clockwise moment about the wheels when the vehicle is propelled in a forward direction. Although each moment is illustrated about a front axle of the vehicle 20, one or more of theses moments may act about both the front and rear axles. Because the vehicle 20 is at standstill, $T_{veh}$ is equal to zero and the primary road load is due to gravity. Equation 2 represents an equation for calculating the road-grade torque ($T_{rg}$):

$$T_{rg}=Mg \, \mathrm{Sin}(\theta)*R_w \tag{2}$$

Where M is the mass of the vehicle; g is the acceleration due to gravity; θ is road gradient; and $R_w$ is the radius of the drive wheels.

One way to prevent rollback of the vehicle is to delay releasing of the brakes until the propulsion torque $T_{acc}$ exceeds the road-grade torque $T_{rg}$. The propulsion torque required to counteract road grade and prevent rollback may be referred to as a grade-compensation wheel torque. Generally, the grade-compensation wheel torque is equal to the road-grade torque albeit in an opposite direction of rotation. Described below are systems and methods of launching a vehicle in the one-pedal mode such that rollback is prevented.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 40. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 3:
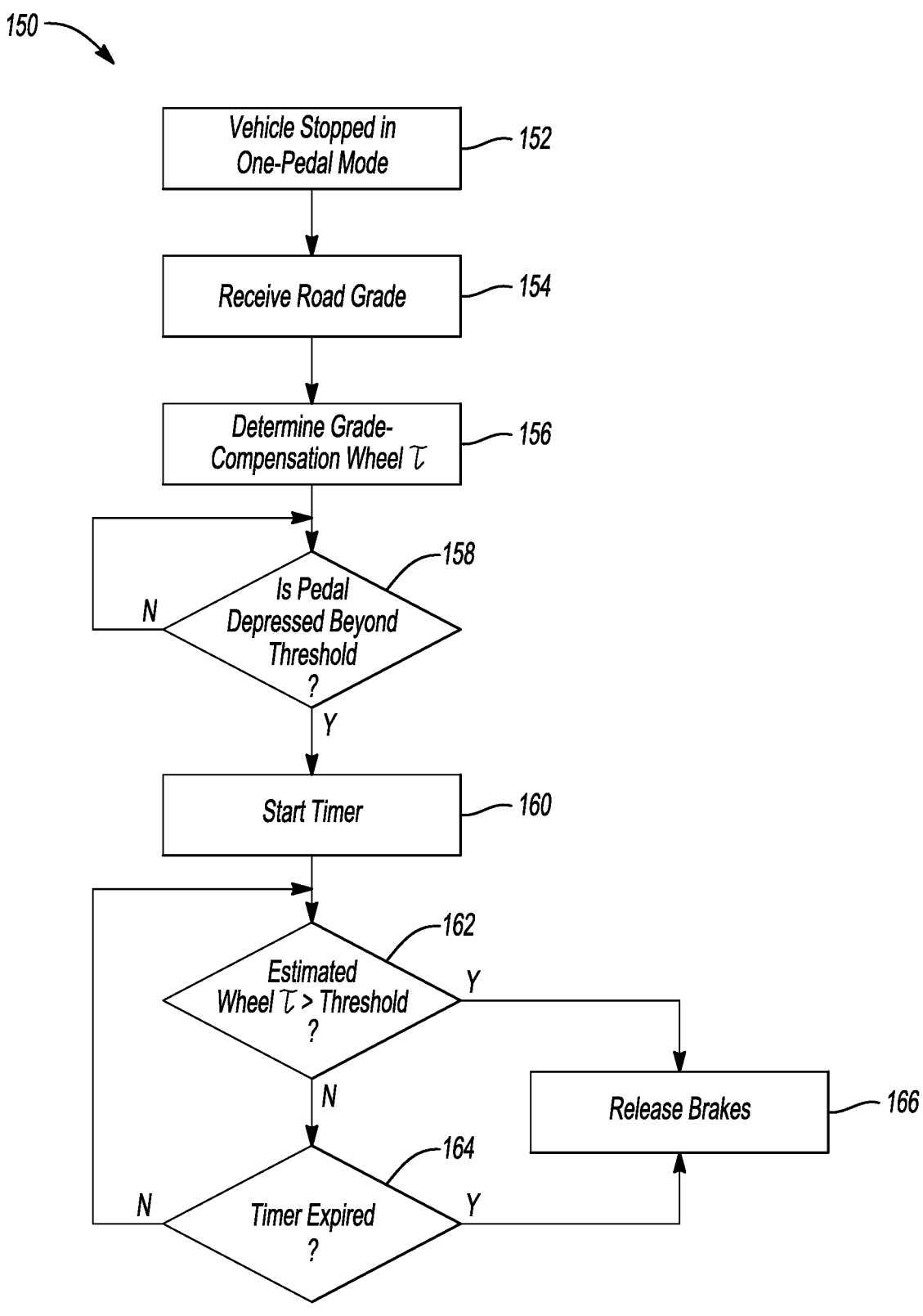
FIG. 3 is a flowchart of an algorithm for launching a vehicle when in a one-pedal driving mode.

FIG. 3 is a flowchart 150 of an algorithm for controlling the vehicle launch in a one-pedal driving mode. The flowchart 150 begins at operation 152 where the vehicle has been stopped in a one pedal driving mode. At operation 152, the friction brakes have been engaged to prevent the vehicle from moving. At operation 154, the controller receives the road grade. In one embodiment, the controller receives a calculated road grade from another control module that has calculated the road grade based on signals from the sensors as described above. Alternatively, the controller may calculate the road grade at operation 154 based on signals from the sensors. Once the road grade has been established, control passes to operation 156 and the controller determines a grade-compensation wheel torque. The grade-compensation wheel torque may be calculated by comparing the accelerometer-based longitudinal acceleration to the acceleration derived from motor speed as discussed about albeit with the sign inverted.

At operation 158, the controller determines if the accelerator pedal has been depressed beyond a threshold pedal position. Threshold may be used to determine if the driver is intentionally depressing the accelerator pedal at operation 158. For example, the threshold may be set at 2 percent of pedal depression. Depressing the pedal beyond the threshold starts a timer at operation 160. In operation 162, the controller determines if an estimated torque at the driven wheels (estimated wheel torque) is greater than a grade-compensation torque threshold. If yes, the brakes are released at operation 166 and the vehicle is launched as the powertrain is producing sufficient torque to launch the vehicle forward without rollback. The estimated wheel torque of operation 162 may be based on the driver-demanded torque, the grade compensation torque, drivability filtering, and may be modified as a function of the brake torque request.

The grade-compensation torque threshold at operation 162 is based on the grade-compensation wheel torque of operation 156. In one embodiment, the threshold may be equal to the grade-compensation wheel torque. In other embodiments, the threshold may be based on the grade-compensation wheel torque, such as a lesser percentage of the grade-compensation wheel torque. For example, the threshold may be 98 percent of the grade-compensation wheel torque. This, of course, is just an example and other percentages may be used. The vehicle controller may include one or more associated lookup tables that provide values for the threshold for various grade-compensation wheel torques. Table 1 is an example of a simplified lookup table for the grade-compensation torque thresholds. The torque values are in Newton-meters.

TABLE 1

| Grade-compensation torque thresholds Grade-compensation torque | | | | | | | |
|---|---|---|---|---|---|---|---|
| <150 | 200 | 250 | 300 | 350 | 400 | 450 | 500 |
| Threshold 0 | 196 | 245 | 294 | 343 | 392 | 441 | 490 |

As shown in Table 1, the threshold may be zero when the grade-compensation torque is less than a certain valve, such as 150 Newton-meters. This essentially accounts for when the vehicle is on flat ground or on a downhill slope. That is, releasing of the brakes is not delayed when the grade compensation torque is below a certain value as rollback is not a significant issue in that scenario.

If the estimated wheel torque does not exceed the grade-compensation threshold at operation 162, control passes operation 164 and the controller determines if the timer has expired. If no, control continues to loop between operations 162 and 164. During this loop, the brakes are held until the driver increases the accelerator pedal position such that the estimated wheel torque exceeds the threshold, at which point the brakes are released at operation 166 absent input from a brake pedal. That is, the controls expect that the driver will further depress the accelerator pedal more and more in response to the vehicle continuing to be stationary until the driver is requesting sufficient torque to exceed the threshold. In the event that the driver fails to exceed the grade-compensation torque threshold, the brakes are released in response to the timer expiring at operation 164. Once the timer expires, the driver is required to depress the brake pedal to remain stationary or further depress the accelerator pedal to propel the vehicle forward. The timer may be set to between 1 and 4 seconds, inclusive. This is just an example, and other times may be used.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a powertrain including an electric machine configured to power driven wheels;
   friction brakes; and
   a controller programmed to, in response to the vehicle being in a one-pedal driving mode and the friction brakes automatically engaged to hold the vehicle stationary, release the friction brakes absent input from a brake pedal in response to an estimated torque of the driven wheels exceeding a grade-compensation torque threshold that is based on road grade to launch the vehicle without rollback.

2. The vehicle of claim 1, wherein the controller is further programmed to, with the vehicle being in the one-pedal driving mode and the friction brakes automatically engaged to hold the vehicle stationary, release the friction brakes absent input from the brake pedal in response to an accelerator pedal being depressed for longer than a threshold time.

3. The vehicle of claim 2, wherein the threshold time is between one and four seconds, inclusive.

4. The vehicle of claim 1, wherein the controller is further programmed to, with the vehicle being in the one-pedal driving mode and the friction brakes automatically engaged to hold the vehicle stationary, release the friction brakes absent input from the brake pedal in response to (i) the estimated torque of the driven wheels being less than the grade-compensation torque threshold and (ii) an accelerator pedal being depressed for longer than a threshold time.

5. The vehicle of claim 1, wherein the grade-compensation torque threshold is less than a grade-compensation torque required to prevent rollback.

6. The vehicle of claim 5, wherein the grade-compensation torque threshold is a percentage of the grade-compensation torque.

7. The vehicle of claim 5, wherein the grade-compensation torque threshold is zero when the grade-compensation torque is less than a predetermined value.

8. The vehicle of claim 1, wherein the grade-compensation torque threshold is equal to a grade-compensation torque required to prevent rollback.

9. The vehicle of claim 1 further comprising an accelerator pedal, and wherein the controller is further programmed to, with the vehicle being in the one-pedal driving mode, regeneratively brake the vehicle in response to the accelerator pedal being released, and engage the friction brakes in response to a speed of the vehicle being zero.

10. A vehicle comprising:
an accelerator pedal;
a brake pedal;
a powertrain including an electric machine configured to power driven wheels;
friction brakes; and
a controller programmed to, during a one-pedal driving mode:
    command the electric machine to propel and regeneratively brake the vehicle based on a position of the accelerator pedal only,
    in response to the vehicle becoming stationary, command engagement of the friction brakes and end regenerative braking, and
    in response to, the vehicle being stationary, the position of the accelerator pedal exceeding a predefined threshold position and an estimated torque of the driven wheels exceeding a grade-compensation torque threshold that is based on road grade, release the friction brakes, absent input from the brake pedal, to launch the vehicle without rollback.

11. The vehicle of claim 10, wherein the controller is further programmed to, during the one-pedal driving mode, release the friction brakes absent input from the brake pedal in response to the position of the accelerator pedal exceeding the predefined threshold position for longer than a threshold time.

12. The vehicle of claim 10, wherein the controller is further programmed to:
receive a signal indicative of the road grade, determine a grade-compensation torque based on the road grade, wherein the grade-compensation torque is equal to a torque at the wheels required to prevent rollback of the vehicle, and determine the grade-compensation torque threshold based on the grade-compensation torque.

13. The vehicle of claim 12, wherein the grade-compensation torque threshold is a lesser percentage of the grade-compensation torque.

14. The vehicle of claim 12, wherein the grade-compensation torque threshold is zero when the grade-compensation torque is less than a predetermined value.

15. The vehicle of claim 10, wherein the controller is further programmed to, during the one-pedal driving mode, in response to (i) the estimated torque of the driven wheels being less than the grade-compensation torque threshold and (ii) the accelerator pedal being depressed for longer than a threshold time, release the friction brakes absent input from the brake pedal.

16. The vehicle of claim 15, wherein the threshold time is between one and four seconds, inclusive.

17. The vehicle of claim 15, wherein the grade-compensation torque threshold is less than a grade-compensation torque required to prevent rollback.

18. A method of launching a vehicle when in a one-pedal driving mode, comprising:
    commanding an electric powertrain to propel and regeneratively brake the vehicle based on a position of an accelerator pedal only;
    in response to the vehicle becoming stationary, commanding engagement of friction brakes; and
    releasing the friction brakes in response to an estimated wheel torque exceeding a grade-compensation torque threshold that is based on road grade to launch the vehicle without rollback.

19. The method of claim 18 further comprising releasing the friction brakes in response to the accelerator pedal being depressed for longer than a threshold time.

20. The method of claim 18 further comprising:
receiving a signal indicative of the road grade;
determining a grade-compensation torque based on the road grade, wherein the grade-compensation torque is equal to a torque at the wheels required to prevent rollback of the vehicle; and
determining the grade-compensation torque threshold based on the grade-compensation torque.

\* \* \* \* \*